July 10, 1956 C. G. MILLER 2,753,610
PANEL FASTENER

Filed Dec. 28, 1951 2 Sheets-Sheet 1

INVENTOR
Charles G. Miller
BY
Wooster Davis ATTORNEYS

July 10, 1956　　　C. G. MILLER　　　2,753,610
PANEL FASTENER

Filed Dec. 28, 1951　　　　　2 Sheets-Sheet 2

INVENTOR
Charles G. Miller
BY
Worster & Davis
ATTORNEYS

United States Patent Office 2,753,610
Patented July 10, 1956

2,753,610

PANEL FASTENER

Charles G. Miller, Westport, Conn.

Application December 28, 1951, Serial No. 263,920

9 Claims. (Cl. 24—221)

This invention relates to fasteners for fastening two members together, and particularly a fastener for securing a member to or mounting it on one side of a panel, and has for an object to provide an improved simple construction comprising a minimum number of parts which may be easily and quickly applied to the member to be fastened to the panel or other member, and as easily and quickly removed.

It is another object to provide a fastener which includes a stud comprising a headed shank to pass through an opening in one member, a resilient rubber block or holding member mounted on the shank, a cam member for compressing this block longitudinally to cause it to expand or spread laterally when in an opening of a member to which the first member is to be fastened, and means on the stud cooperating with the cam member by relative turning movements between them to compress the resilient block and cause it to spread or expand into the clamping position.

A further object is to provide a fastener which may be used to secure a member to the front side of a panel or other plate or release it from the plate by operation only from the front side of said panel or plate and without the necessity of gaining access to the rear side of said panel or plate.

It is still another object to provide a fastener of this type which may be made in very small sizes for use in locations where only a small space is available.

With the foregoing and other objects in view I have devised the construction illustrated in the accompanying drawings forming a part of this specification. It is, however, to be understood the invention is not limited to the specific details of construction and arrangement shown, but may embody various changes and modifications within the scope of the invention.

Figure 1:
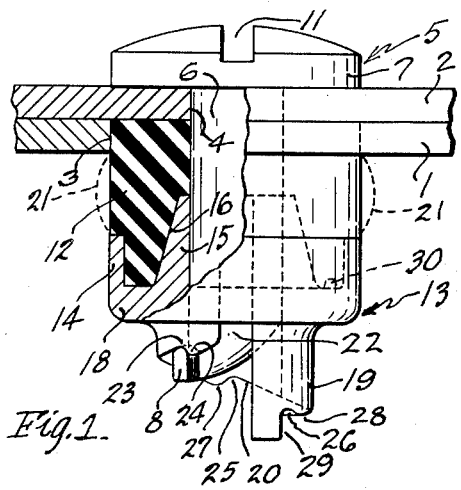
Fig. 1 is a partial side elevation and partial section of one form of the device on an enlarged scale showing the elements in the position they occupy before the fastener is tightened or set up to hold it in position.

The fastener is shown in the drawings as securing together two plates or plate-like members placed one upon the other or side by side, and either one may be considered the panel member and the other the member to be secured to the panel member, but ordinarily the lower plate 1 is considered the stationary part, panel or supporting member, and the upper member 2 the removable member to be secured to the other member, and although they are shown in the horizontal relation in the drawings it will of course be understood they may be in the vertical or any other position. The member 1 has an opening 3 thereinto receive one end portion of the clamping member and the other member 2 has a smaller opening 4 for the shank of the stud, as will be more clearly described later.

Referring first to the form of Fig. 1, the device comprises a central stud 5 including a shank 6 and an enlarged head 7 at one end and a laterally extending lug or wing 8 at the other end preferably forged or swaged in one piece with the shank 6 so as to be integral therewith, thus permitting use of a smaller stud, although it is not limited to this construction as the lug could be a separate member fastened to the stud in any suitable manner, this lug being rounded at its inner or under side 9 to run more easily on the cooperating cam surface, as will later be described, and the end of the shank being curved or rounded as shown at 10 so that it can be more easily passed through the opening 4 in the plate 2 by merely inclining or tipping it at an angle or rocking it laterally. The head 7 is provided with some means to receive or cooperate with a tool for turning the stud, such, for example, as a transverse slot 11 to receive the bit of a screw driver, or the head could be noncircular or provided with a noncircular socket for operation with any suitable type of wrench, or wing, handle or other suitable means, as will be understood.

On the shank 6 of the stud is a block or gland 12 of resilient deformable material, such, for example, as live rubber or synthetic rubber, and this block is preferably made by molding it of this material. At the opposite side or end of the member 12 from the head of the stud and also embracing the stud is a cam member 13. In the form of Fig. 1 this member overlies and engages the end of the member 12 and it is preferably provided with a peripheral flange 14 embracing the end of the member 12 and forming a shallow socket in which this end of the member seats. The member 13 is also preferably provided with a conical or tapered extension 15 seating in a similarly shaped socket or recess 16 in the resilient member 12 to assist in expanding or spreading the member 12 laterally in the clamping or tightening operation. The end of the member 12 may or may not be decreased as indicated at 17 to seat within the flange 14, but it is preferably reduced as shown in Fig. 1, so that the outer surfaces of the members 12 and 14 will be of substantially the same diameter and therefore form a continuous outer surface for the device. The member 13 comprises a body or flange portion 18 and on the outer side of this and opposite to the tapered extension 15 is an extension 19 provided with an inclined cam surface 20 with which the laterally extending lug or wing 8 of the stud 5 cooperates to force the member 13 toward the head 7, that is, toward the plates 1 and 2 to longitudinally compress the resilient member 12 and cause it to deform or expand laterally, as indicated in dotted lines 21 in Fig. 1, so as to overlie the lower surface of plate 1 about the opening 3. The diameter of the upper end of the member 12 is substantially the same as or somewhat smaller than the opening 3 in plate 1 so as to seat in this opening and against the lower or inner surface of the plate 2. To permit the lug 8 to pass through the cam member 13 from the upper side thereof to the lower side on which the cam surface is located, this member 13 is provided with a longitudinal slot or channel 22 running the length of the member 13 and located between the high and low points of the cam surface 20. Closely adjacent one side of the slot 22, the cam surface is provided with a depression 23 with a raised portion 24 between it and the slot 22, so that in normal position before tightening the clamp the lug or wing 8 will seat in this depression, as shown in Fig. 1, and be held there to keep the fastener in assembled condition. The device is now in position for tightening or securing in clamped position, and all that is necessary to do this is to turn or rotate the stud 5 by means of a screw driver or other tool to cause the lug or wing 8 to move around on the inclined cam surface 20. This movement forces the member 13 upwardly or toward the head 7 and the plates 1 and 2, and compresses the resilient member 12 causing it to expand or spread laterally, as indicated in dotted lines 21, so that it is now of greater diameter at its intermediate portion than the diameter of the opening 3 in the plate 1. It will therefore clamp itself tightly against the edges of the opening 3, and the enlarged portion will be tight against and overhang the lower surface of the plate 1 about this opening and will therefore clamp the two members 1 and 2 tightly together and form a fastening means between them. The fastener may be released to permit the members to be separated by merely rotating the stud 5 in the opposite direction to permit the member 13 to be shifted outwardly or downwardly by the action of the resilient member 12, which thus returns to its normal or original diameter, which is of a size to pass through the opening 3 to a position to retain the device in the locked or clamped position, or may be removed to permit separation of the members 1 and 2. The inclined cam surface 20 may be provided with one or more depressions or recesses 25 and 26 in which the lug or wing 8 seats after moving up the cam surface and in which it is releasably retained by the raised portions 27 and 28 respectively at the lower sides of the recesses. If the stud is only turned part way so as to rest in the depression 25 it will be clear the resilient block or gland 12 is not compressed as much or as tightly against the members 1 and 2 as it is when the stud is turned to carry the wing 8 into the higher depression 26. At the opposite side of this depression is a stop shoulder 29 to limit further movement of the stud and the wing 8. To prevent possible relative turning movement of the member 13 by turning action of the stud and the movement of the wing 8 on the inclined cam surface, the member 18 may be provided with one or more pips or small lugs 30 which will be forced into the end of the member 12 to form a grip between them, but it has been found that with the construction of Fig. 1 these lugs are not ordinarily required.

This fastener may be assembled on the member 2 by inserting the shank 6 through the opening 4, the plug or wing 8 being passed through by tipping this shank laterally at an angle, the curved end 10 providing sufficient clearance. The resilient block or gland 12 of resilient rubber or similar material is then slid down to the shank, this yielding sufficiently to permit passage of the lug 8, and then the member 13 is added and pressed against the end of the member 12, the lug 8 passing through the slot 22. It is preferred that the block 12 be of a size to require slight compression of member 12 to permit movement of the lug 8 over the raised portion 24 into the depression 23 and thus hold the parts together by tendency of the member 12 to expand. Then after it is assembled on the member 2 it may be inserted through the opening 3 to permit the two members 1 and 2 to be secured or be brought closely together and then securely fastened by turning the stud member 5, as described above. Its release to permit separation of the two members is as simple an operation as the securing operation, as it requires merely a reverse movement of the stud 5, bringing the cam lug 8 back to the recess 23, as shown in Fig. 1, permitting the resilient block or gland 12 to return to its normal diameter so that member 2 and the fastener can be removed by withdrawing the fastener through the opening 3.

Figure 8:
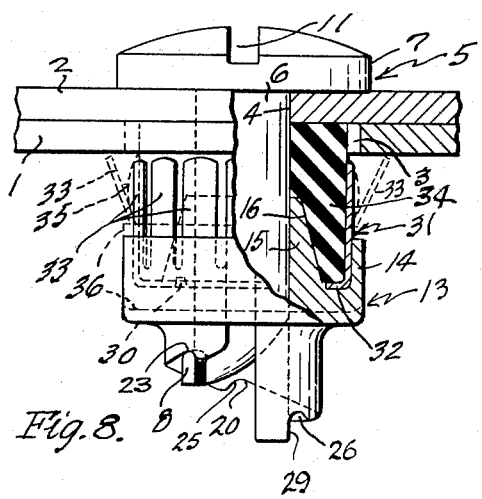
Fig. 8 is a partial side elevational and partial section showing a modified form of the device, showing the elements in the position they occupy before the fastener is tightened or set up to hold it in position.
Figure 2:
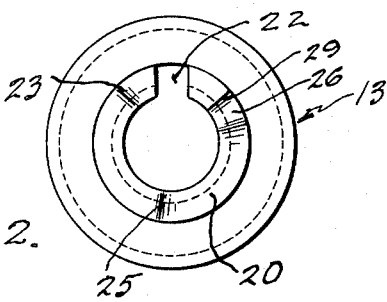
Fig. 2 is an end view of the cam member looking toward the bottom of Fig. 1.

A somewhat modified form of the device is shown in Fig. 8, although the principle is the same and it operates in the same manner as the device of Fig. 1. It uses basically the three members of the device of Fig. 1, plus a reinforcing cupped or expansion spring member 31 comprising a bottom or head portion 32 and the sides comprising a series of preferably spaced spring fingers 33 embracing the resilient rubber block or gland 34 corresponding to the member 12 of Fig. 1. The cam member 13 is the same as that of Fig. 1 and the ends of the resilient rubber block 34 and the member 31 are seated in this member. The stud 5 is the same as that of Fig. 1.

Figure 9:
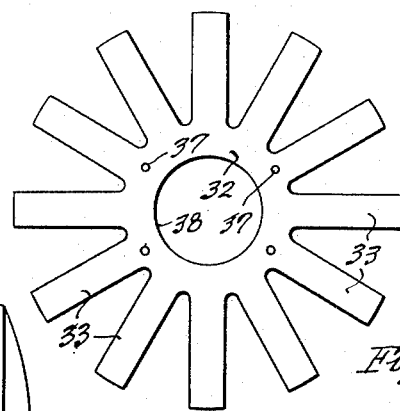
Fig. 9 is a plan view of the blank of the cage or spring reinforcing member of Fig. 8.
Figures 3, 4:
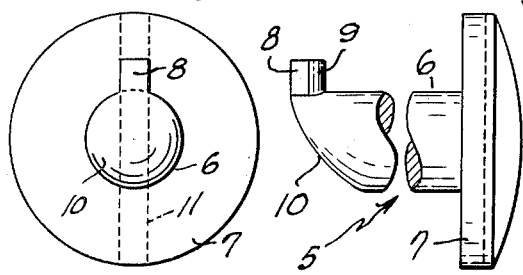
Figs. 3 and 4 are an end and side elevation respectively of the stud member.
Figure 10:
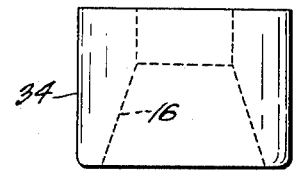
Fig. 10 is a side view of the resilient compressible member of Fig. 8.
Figures 5, 6, 7:
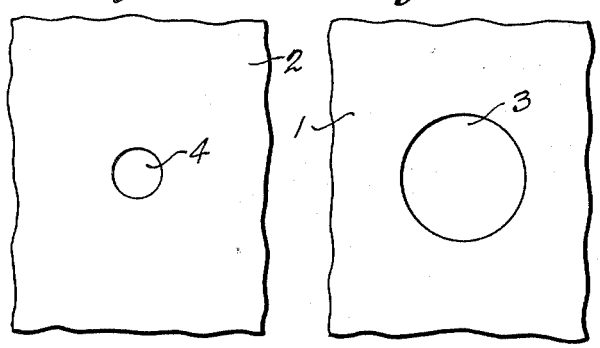
Fig. 5 is a side elevation of the resilient block member of Fig. 1.
Figs. 6 and 7 are side views respectively of portions of the two plates to be secured together, for purposes of illustration.

As in the form of Fig. 1, the cam member 13 and resilient rubber block are of diameters to pass through the opening 3 in the plate 1 to the position of Fig. 8, and then by turning the stud member 5 the cam wing or lug 8 passes up the inclined cam surface 20, drawing the cam member 13 toward the head 7 and the members 1 and 2, causing the resilient rubber member 34 to expand or spread laterally. Part of this movement is indicated by the dotted lines 35. The length of the spring fingers 33 is such that in the unclamped position of Fig. 8 their free ends have passed beyond the lower surface of the plate 1. As the cam member 13 moves upwardly, as indicated by the dotted lines 36, it carries this spring member 31 with it and the lateral spreading of the rubber block 34 forces the free ends of these spring members outwardly, as indicated by the dotted lines 33, so that the free ends of these fingers are clamped against the surface of the plate 1, making a metal-to-metal clamp or lock, while the resilient rubber member 34 expands, the same as the member 12 in Fig. 1, to fill the opening 3 and overlap or extend beyond the periphery thereof to set the fastener and tightly clamp the two members 1 and 2 together. To prevent relative turning movement between the cam member 13 and the spring member 31, the member 13 may be provided with the pips or small lugs 30 to pass through openings 37 in the head 32 of the spring member. Fig. 9 shows the blank of this member in the flattened condition, and before use the fingers 33 are bent at right angles to the bottom or wing portion 32 to form the cupped spring member, the central opening 38 in this bottom or head portion being of a size to pass over the cone or tapered portion 15 of the cam member 13. Otherwise the action is the same as that of the device of Fig. 1.

Figure 11:
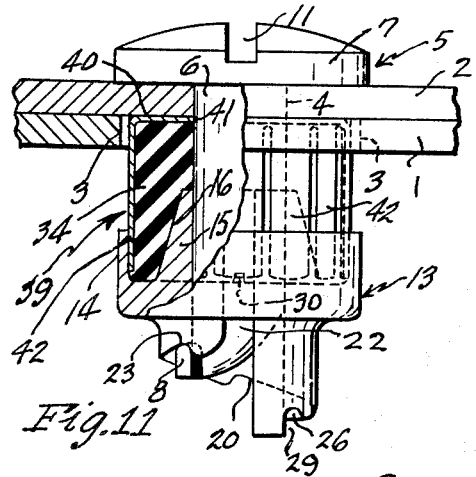
Fig. 11 is a partial side elevation and partial section of still another modified form showing the elements in the position they occupy before the fastener is tightened or set up to hold it in position.
Figure 12:
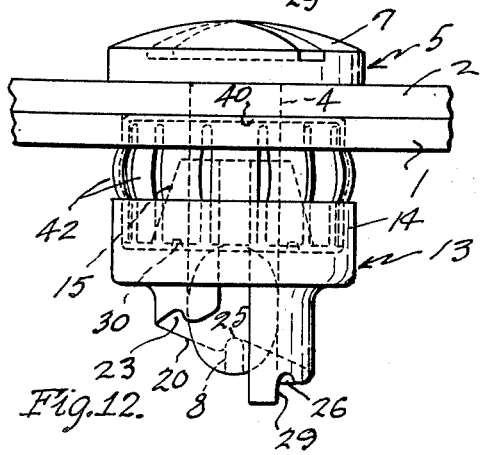
Fig. 12 is a side elevation of the device of Fig. 11 showing it tightened or set up to holding position.
Figure 14:
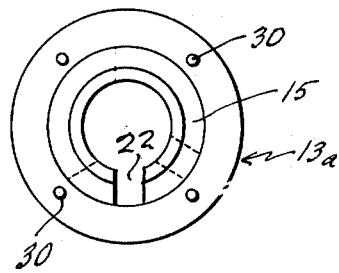
Fig. 14 is a top view of the clamping member of Fig. 13.

Another modification is shown in Figs. 11 and 12. In this device is used the same stud member 5 and the same cam member 13 as in the forms of Figs. 1 and 8. The rubber resilient gland 34 is the same as that of Fig. 8. In this case, however, the cupped reinforcing member 39, substantially the same as the member 31, is reversed so that its head portion 40 receives the upper end of the resilient rubber 34 and has an opening 41 for the shank of the stud 5. The sides of this member are formed by a series of spring fingers 42 corresponding to the fingers 33 of the form of Fig. 8, but the free ends of these fingers extend into the recess or socket on the inner side of the flange 14 of the cam member so that they are retained against outward movement. As in the other forms, the cam member 13 may pass through the opening 3 in the plate 1 when the elements are in the unclamped position of Fig. 11, and then by turning the stud 5 the cam lug or wing 8 moves up the inclined cam surface 20, drawing the cam member 13 upwardly or toward the head 7 and the members 1 and 2, and in this movement it compresses the resilient rubber 34 longitudinally and causes it to spread or expand laterally, the same as in the first form, spreading outwardly the spring fingers 42 to overlap the edges of the opening 3, as shown in Fig. 12, to set the fastener and clamp the two members 1 and 2 together. On turning the stud 5 in the opposite direction, the resilient rubber 34 and the resilient spring fingers 42 resume their original form as shown in Fig. 11, thus releasing the members 1 and 2 and permitting withdrawal of the clamp through the opening 3. This fastener also has a metal-to-metal lock.

Figure 13:
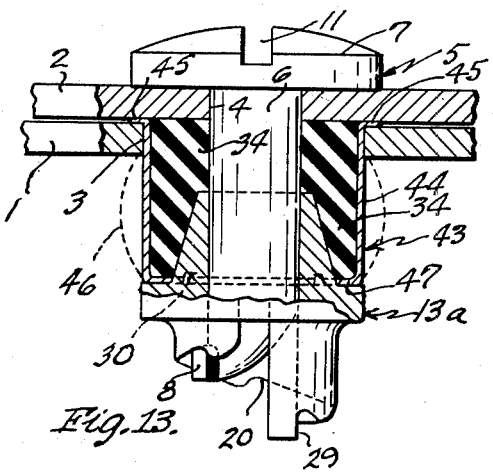
Fig. 13 is a partial side elevation and partial section of still another modification showing the elements in the position they occupy before the fastener is tightened or set up to hold it in position.
Figures 15, 16:
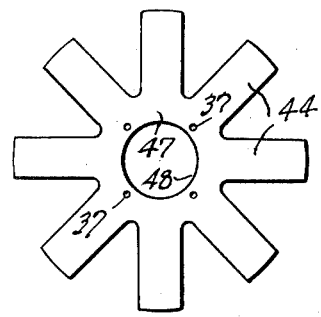
Fig. 15 is a plan of a blank for the expansion spring reinforcing member of the form of Fig. 13.
Fig. 16 is an edge view showing the form after the next operation.
Figure 17:
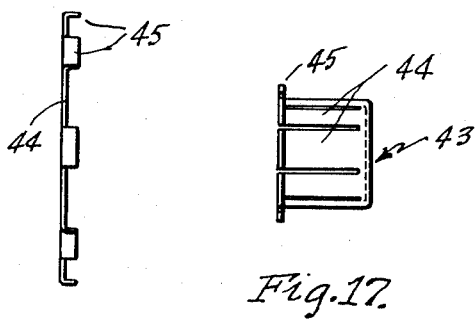
Fig. 17 is a side elevation of the finished member.

In the form of Fig. 13, the resilient rubber block 34 is the same as in Figs. 8 and 11. The stud 5 is the same as in the other forms, and the clamping member 13a is the same as that of the other forms except that the flange 14 is omitted, although this flange could be used in this form if desired. Otherwise this cam member 13a cooperates with cam lug or wing 8 on the stud 5 the same as in the other forms. However, in this case the spring cupped reinforcing member 43 is substantially the same as that of Fig. 8 except that the side fingers 44 are made of sufficient length to extend at their free ends through the opening 3 and are provided with laterally extending flanges 45 at their free ends to extend and clamp between the two members 1 and 2, as shown in Fig. 13. When the stud member 5 is turned to cause the cam lug 8 to pass up the inclined cam surface 20, the resilient rubber member 34 is compressed longitudinally so that it expands or spreads laterally as in the other forms and curves the spring fingers 44 outwardly, as indicated by dotted lines 46 in Fig. 13, to overlie the edges of the opening 3 and set up the fastener and securely clamp the two members 1 and 2 together the same as in the other forms, and the lateral flanges 45 provide a metal-to-metal clamping surface, and this form also provides the metal-to-metal lock. To prevent relative turning between the cam member 13a and the cupped spring member 43, the cam member may be provided with pips or small lugs 30 the same as the other forms, to enter openings 37 in the head portion of the member 43. A blank of this member 43 is shown in the flat condition in Fig. 15. Fig. 16 shows the next form in which the ends of the fingers 44 have been bent laterally to substantially right angles to the body of the fingers, and Fig. 17 shows the next form in which the member has been formed to a substantially cup shape, with the fingers 44 at substantially right angles to the head portion 47, and with the flanges 45 extending outwardly from the free ends of the fingers 44. The head portion 47 is provided with an opening 48 to pass over the cone shaped or tapered portion 15 of the cam member.

The function and operation of the device is the same in all of the forms shown, and in each form the cam member 13 and 13a overlies the resilient rubber block 12 or 34 so that on operation of the stud with a turning movement, the cam lug or wing 8 of this stud by riding up on the inclined cam surface 20 draws the cam member toward the head 7 and toward the members 1 and 2 to be secured together. This action compresses the resilient rubber block or gland longitudinally, and causes it to expand or spread laterally and overlie the edges of the opening 3 in the member 1, to securely clamp the fastener to the members to be secured together, and to securely clamp the fastener and the two members 1 and 2 together. By using a single lug operating on the cam surface a greater travel of the lug is permitted with a longer cam surface, approximately 290°, a greater compression of the rubber block is possible with a given cam pitch, which is a material advantage and produces a fastener which may be more tightly and securely clamped, that is, permitting maximum tightening this simple fastener, and more secure clamping of the members 1 and 2 being secured. In the forms of Figs. 8, 11 and 13, the additional cupped resilient spring member is a reinforcing member for this resilient rubber block and also is a means for forming a metal-to-metal lock for the fastener and the members to be secured. The members may be made of any suitable material, the cam 13 and 13a being preferably a zinc alloy die casting, while the spring reinforcement cup 31, 39 and 43 is preferably of tempered beryllium copper, or light spring steel.

It is to be understood that in the drawings the parts are shown on an enlarged scale and the relative thicknesses between parts are considerably exaggerated. By making the cam lug or wing 8 integral with the stud a much smaller fastener can be used as the stud can be made smaller because it is not necessary to provide the extra stock or size necessary to hold or support a separate element.

Having thus set forth the nature of my invention, I claim:

1. A fastener comprising a stud including a headed shank, a cam member slidable on the shank, a securing means on the shank between the head and the cam member including a resilient rubber block yieldable laterally to a clamping position and an expansion spring cupped member in which the block is seated, said spring member including an end portion and a connected side wall comprising a series of longitudinal spring fingers at the outer side of the block, said cam member being provided with an inclined cam surface on the opposite side from the securing means, and said stud being provided with a lateral lug cooperating with the cam surface on turning movement of the stud to shift the cam member toward the securing means and compress the block.

2. A fastener comprising a stud including a headed shank, a cam member slidable on the shank, a securing means on the shank between the head and the cam member including a resilient rubber block yieldable laterally to a clamping position and provided with a tapered socket in the end opposite the head on the shank, a cupped reenforcing spring member embracing the block and including an end portion at one end of the block and a series of longitudinal spring fingers at the sides of the block, said cam member being provided with a similarly tapered extension on one side seated in said socket and an inclined cam surface on its opposite side, and said stud being provided with a lateral lug cooperating with the cam surface on turning movement of the stud to shift the cam member toward the securing means to spread the block laterally.

3. A fastener comprising a stud including a headed shank, a cam member slidable on the shank, a securing means on the shank between the head and the cam member including a resilient rubber block yieldable laterally to a clamping position, a cupped reenforcing spring member embracing the block and including an end portion at one end of the block and a series of longitudinal spring fingers at the sides of the block, said cam member being provided with a peripheral flange on one side forming a socket in which the adjacent ends of the block and the spring member are located and having an inclined cam surface on the opposite side, and said stud being provided with a lateral lug cooperating with the cam surface on turning movement of the stud to shift the cam member toward the securing means to spread the block laterally.

4. In a fastener of the character described, a pair of members arranged side by side and provided with aligned openings of different diameters, a headed stud including a shank passed through said openings and of substantially the diameter of the smaller opening, a block of yieldable resilient material embracing the shank and of substantially the same diameter as and seated at its outer end in the larger opening at the inner side of the member having the smaller opening, said block being of greater length than the thickness of the member having the larger opening and free to expand laterally to a greater diameter than said opening by longitudinal compression of the block, a cam member including a body provided with a longitudinal opening of substantially the size of the shank and through which the shank extends so that the cam member overlies the inner end of the block, said cam member being provided with an inclined cam surface about said opening at the inner side of the body extending for substantially the full circumference of the opening, a single lateral lug only on the shank engaging said cam surface to force the cam member toward the stud head and compress the resilient block to cause it to expand laterally over the inner side of the member with the larger opening and about said opening by turning movement of the stud to fasten the pair of members together, the free end of the shank on the opposite side thereof from the lug being inclined backwardly to permit the shank to be passed through the smaller opening in said pair of members by tilting the shank laterally to an angle inclined to the plane of the member provided with this opening, and the cam member being provided with a longitudinal channel at one side of the opening therein leading to the cam surface for passage of the lug to this surface and separating the opposite ends of this surface.

5. In a fastener of the character described a headed stud including a shank to pass through an opening of substantially the same size in a member to be fastened to a panel member, a block of resilient yieldable material embracing the shank and of a larger diameter than the shank to seat at its outer end in an opening of substantially the same diameter in the panel member at the inner side of the first member, said block being of greater length than the thickness of the panel member and free to expand laterally to a larger diameter by longitudinal compression of the block, a cam member including a body provided with a longitudinal opening of substantially the size of the shank and through which the shank extends so that the cam member overlies the inner end of the block, said cam member being provided with an inclined cam surface about said opening at the inner side of the body, extending for substantially the full circumference of the opening, a single lateral lug only on the shank engaging said cam surface to force the cam member toward the stud head and compress the resilient block to cause it to expand laterally over the inner side of the panel member about the opening therein by turning movement of the stud to secure the first member to the panel member, the free end of the shank on the opposite side thereof from the lug being inclined backwardly to permit the shank to be passed through the opening in said first member by tilting the shank laterally to an angle inclined to the plane of said member, and the cam member being provided with a longitudinal channel at one side of the opening therein leading to the cam surface and located between the opposite ends thereof for passage of the lug to this surface, and a stop shoulder between each end of the cam and the channel.

6. A panel fastener comprising a headed stud including a shank to pass through an opening in a member to be fastened to a panel member, a block of resilient yieldable material embracing the shank of a larger diameter than the shank to be located in a larger opening in the panel member and of a length to pass through and extend beyond the panel member, a cam member including a body provided with a longitudinal opening through which the shank passes so this member overlies the block, said cam member being provided with an inclined cam surface about said opening at the outer side of the body extending for substantially the full circumference of the opening, and a single lateral lug on the shank of the stud engaging said cam surface to force the cam member toward the stud head and compress the resilient block to cause it to expand laterally over the surface of the panel member to retain it in the opening by turning movement of the stud, said cam member provided with a longitudinal channel at one side of the opening therein leading to the cam surface between the high and low ends of this surface for passage of the lug through the opening to this surface, said cam surface having a recess closely adjacent each side of said channel in which the lug may seat and be retained thereby against turning of the shank, and a stop shoulder between the recess at the higher end of the cam surface and the channel to prevent turning of the shank to carry the stud off the high side of the cam surface into the channel.

7. A fastener comprising a stud including a headed shank, a cam member slidable on the shank, a securing means on the shank between the head and the cam member including a resilient rubber block of greater diameter than the shank and free to yield laterally to a larger diameter to a clamping position by longitudinal compression of the block, said cam member being provided with an inclined cam surface on the opposite side from the securing means, and said stud being provided with a single lateral lug cooperating with the cam surface on turning movement of the stud to shift the cam member toward the securing means and compress the block longitudinally and expand it laterally to holding position, the free end of the stud being convexly curved and backwardly inclined away from the lug so that it may be passed through an opening of substantially the diameter of the shank in a member to be secured by tipping the stud laterally at an angle to said member.

8. A fastener comprising a stud including a headed shank, a cam member slidable on the shank, a securing means on the shank between the head and the cam member including a resilient rubber block of greater diameter than the shank and free to yield laterally to a larger diameter clamping position by longitudinal compression of the block by the cam member and provided with a tapered socket in the end opposite the head on the shank, said cam member being provided with a similarly tapered extension on one side seated in said socket and a peripheral flange spaced outwardly from said tapered extension embracing the end of the block to prevent this end from splitting and breaking under longitudinal compression by the cam member, said cam member provided with an inclined cam surface on its opposite side, and said stud being provided with a lateral lug cooperating with the cam surface on turning movement of the stud to shift the cam member toward the securing means to compress the block and spread it laterally to said clamping position.

9. A fastener comprising a stud including a headed shank to be passed through a circular opening in a member to be fastened to another member, a resilient rubber block on the shank of greater diameter than the shank and free to expand laterally to a larger diameter holding position by longitudinal compression of the block, a cam member on the shank overlying the block on the opposite side thereof from the head of the stud and provided with an inclined cam surface on the opposite side from the block, said stud being provided with a single laterally extending lug only at its free end cooperating with the cam surface to shift the cam member toward the said head to compress the block and spread it laterally to holding position by turning movement of the stud, and the free end of the stud on the opposite side thereof from the lug being inclined backwardly to permit the stud to be passed through an opening in said first member of substantially the diameter of the stud by tilting the shank laterally to an angle inclined to the plane of said member.

References Cited in the file of this patent

UNITED STATES PATENTS

| | | |
|---|---|---|
| 1,414,296 | Menten | Apr. 25, 1922 |
| 2,172,924 | Gwinn et al. | Sept. 12, 1939 |
| 2,311,592 | Hapanowicz | Feb. 16, 1943 |
| 2,356,162 | Johnson et al. | Aug. 22, 1944 |
| 2,365,372 | Allen | Dec. 19, 1944 |
| 2,605,588 | Lindstaedt | Aug. 5, 1952 |